(12) United States Patent  
Jeong et al.

(10) Patent No.: US 8,229,445 B2  
(45) Date of Patent: Jul. 24, 2012

(54) APPARATUS AND METHOD FOR DETERMINING FRACTIONAL FREQUENCY REUSE REGION BY USING BROADCAST REFERENCE SIGNAL IN BROADBAND WIRELESS COMMUNICATION SYSTEM

(75) Inventors: Su-Ryong Jeong, Suwon-si (KR); Jeong-Ho Park, Seoul (KR); Jun-Sung Lim, Seoul (KR); Ho-Kyu Choi, Seongnam-si (KR); Jae-Weon Cho, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 12/470,166

(22) Filed: May 21, 2009

(65) Prior Publication Data

US 2009/0291691 A1 Nov. 26, 2009

(30) Foreign Application Priority Data

May 21, 2008 (KR) ........................ 10-2008-0046935

(51) Int. Cl.  
H04W 72/00 (2009.01)  
H04W 40/00 (2009.01)

(52) U.S. Cl. ........................ 455/450; 450/445

(58) Field of Classification Search .................. 455/445, 455/450  
See application file for complete search history.

(56) References Cited

U.S. PATENT DOCUMENTS

| 6,128,497 | A   | * | 10/2000 | Faruque ........................ 455/447 |
|-----------|-----|---|---------|------------------------------------------|
| 2007/0086406 | A1 | * | 4/2007 | Papasakellariou ............ 370/343 |
| 2007/0177501 | A1 | * | 8/2007 | Papasakellariou ............ 370/229 |
| 2009/0047971 | A1 | * | 2/2009 | Fu ................................. 455/450 |
| 2009/0061778 | A1 | * | 3/2009 | Vrzic et al. ..................... 455/62 |
| 2009/0092086 | A1 | * | 4/2009 | Lee et al. ....................... 370/329 |
| 2009/0103465 | A1 | * | 4/2009 | Chow et al. .................... 370/312 |
| 2009/0129401 | A1 | * | 5/2009 | Kang et al. ..................... 370/431 |
| 2009/0247148 | A1 | * | 10/2009 | Chen et al. ................. 455/422.1 |

FOREIGN PATENT DOCUMENTS

WO WO 2007/078177 A1 * 7/2007

* cited by examiner

*Primary Examiner* — Nathan Mitchell  
(74) *Attorney, Agent, or Firm* — Jefferson IP Law, LLP

(57) ABSTRACT

An apparatus and method for operating a Fractional Frequency Reuse (FFR) scheme in a broadband wireless communication system is provided. The method includes broadcasting a reference value for determining an FFR region, receiving region information determined by using the reference value from at least one Mobile Station (MS), and determining a communication band of at least one MS by using the region information received from the at least one MS.

32 Claims, 9 Drawing Sheets

- ◆ CENTER OF SECTOR 0
- ■ EDGE OF SECTOR 0
- ▲ CENTER OF SECTOR 1
- × EDGE OF SECTOR 1
- ✳ CENTER OF SECTOR 2
- ● EDGE OF SECTOR 2

APPARATUS AND METHOD FOR DETERMINING FRACTIONAL FREQUENCY REUSE REGION BY USING BROADCAST REFERENCE SIGNAL IN BROADBAND WIRELESS COMMUNICATION SYSTEM

PRIORITY

This application claims the benefit under 35 U.S.C. §119(a) of a Korean patent application filed in the Korean Intellectual Property Office on May 21, 2008 and assigned Serial No. 10-2008-0046935, the entire disclosure of which is hereby incorporated by reference.

BACKGROUND OF THE INVENTION

1. Field of the Invention

The present invention relates to a broadband wireless communication system. More particularly, the present invention relates to an apparatus and method for dividing a cell into a cell center region and a cell edge region to use a Fractional Frequency Reuse (FFR) scheme in a broadband wireless communication system.

2. Description of the Related Art

In a broadband wireless communication system, a Fractional Frequency Reuse (FFR) scheme may be used to reduce inter-cell interference. In the FFR scheme, a cell is divided into a center region and an edge region, and Mobile Stations (MSs) located in the center region and MSs located in the edge region are set to different frequency reuse rates. For example, if three cells are located as shown in FIG. 1A, each cell uses bands according to the FFR scheme as shown in FIG. 1B. In the case of FIG. 1A, an edge region of a cell A 101, an edge region of a cell B 103, and an edge region of a cell C 105 experience mutual interference. However, a center region of the cell A 101, a center region of the cell B 103, and a center region of the cell C 105 do not experience mutual interference. Therefore, as shown in FIG. 1B, each cell performs communication with MSs located in the edge region through a first band 110 set to a reuse rate of '3' to avoid interference with a neighbor cell, and performs communication with MSs located in the center region through a second band 120 set to a reuse rate of '1'. In this case, a band used by each cell in the first band 110 is determined by default.

As described above, when the FFR scheme is used, a Base Station (BS) performs scheduling by identifying the MSs located in the center region and the MSs located in the edge region. Accordingly, the BS has to be able to identify the MSs located in the center region and the MSs located in the edge region. For this, the BS considers a variety of information such as a propagation (or path) loss from a serving cell of each MS, a propagation loss from neighbor cells (or sectors), etc. That is, the use of the FFR scheme results in a large amount of overhead. In particular, when a large number of the MSs are present in a cell, an overhead caused by identification of MSs exponentially increases. Accordingly, when the FFR scheme is intended to be used, there is a need for a method whereby the FFR scheme is correctly performed while minimizing an overhead caused by identification of the MSs.

SUMMARY OF THE INVENTION

An aspect of the present invention is to address at least the above-mentioned problems and/or disadvantages and to provide at least the advantages described below. Accordingly, an aspect of the present invention is to provide an apparatus and method for using a Fractional Frequency Reuse (FFR) scheme in a broadband wireless communication system.

Another aspect of the present invention is to provide an apparatus and method for reducing an overhead caused by the use of an FFR scheme in a broadband wireless communication system.

Another aspect of the present invention is to provide an apparatus and method for gathering information, indicating distribution of Mobile Stations (MSs) and required for the use of an FFR scheme, with a small overhead in a broadband wireless communication system.

Another aspect of the present invention is to provide an apparatus and method for determining information, indicating distribution of MSs and required for the use of an FFR scheme, by the MSs in a broadband wireless communication system.

Another aspect of the present invention is to provide an apparatus and method for adjusting ranges of a center region and an edge region to increase performance of an FFR scheme in a broadband wireless communication system.

In accordance with an aspect of the present invention, a method of operating a Base Station (BS) supporting an FFR scheme in a broadband wireless communication system is provided. The method includes broadcasting a reference value for determining an FFR region, receiving information regarding the determined region by using the reference value from at least one MS, and determining a communication band of at least one MS by using the region information received from the at least one MS.

In accordance with another aspect of the present invention, a method of operating an MS supporting an FFR scheme in a broadband wireless communication system is provided. The method includes receiving a reference value for determining an FFR region from a BS, measuring one of path loss values and received signal strength values for a serving cell and at least one neighbor cell, determining a region to which the MS belongs by using one of the path loss values and the received signal strength values, and the reference value, and transmitting information reporting the region to the BS.

In accordance with yet another aspect of the present invention, a BS apparatus supporting an FFR scheme in a broadband wireless communication system is provided. The apparatus includes a transmitter for broadcasting a reference value for determining an FFR region, a receiver for receiving information regarding the determined region by using the reference value from at least one MS, and an allocator for determining a communication band of at least one MS by using the region information received from the at least one MS.

In accordance with still another aspect of the present invention, an MS apparatus supporting an FFR scheme in a broadband wireless communication system is provided. The apparatus includes a receiver for receiving a reference value for determining an FFR region from a BS, a measurer for measuring one of path loss values and received signal strength values for a serving cell and at least one neighbor cell, a determinator for determining a region to which the MS belongs by using one of the path loss values and the received signal strength values, and the reference value, and a transmitter for transmitting information reporting the region to the BS.

Other aspects, advantages and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, a technique for correctly identifying Mobile Stations (MSs) with a small overhead when a Fractional Frequency Reuse (FFR) scheme is used in a broadband wireless communication system will be described. In addition, a technique for adaptively determining an FFR region according to a cell property will be described. Although an Orthogonal Frequency Division Multiplexing (OFDM)/Orthogonal Frequency Division Multiple Access (OFDMA)-based wireless communication system will be described below, the present invention may equally apply to other types of wireless communication systems.

Figure 1A:
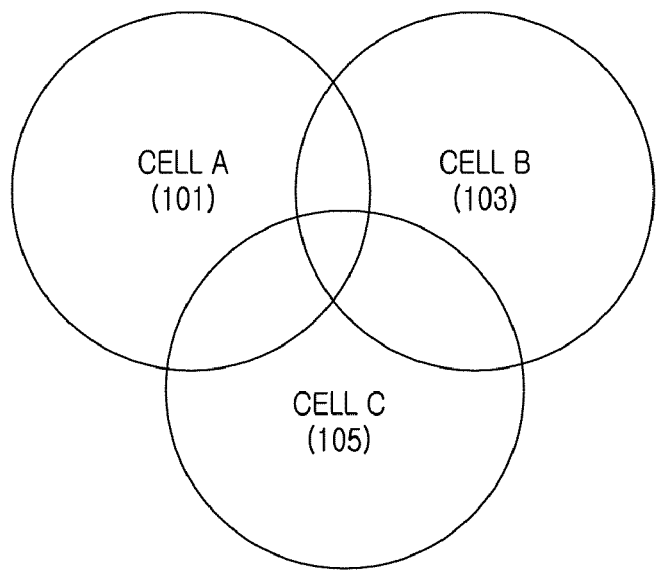
FIGS. 1A and 1B illustrate an example of band usage based on a Fractional Frequency Reuse (FFR) scheme in a broadband wireless communication system.
Figure 1B:
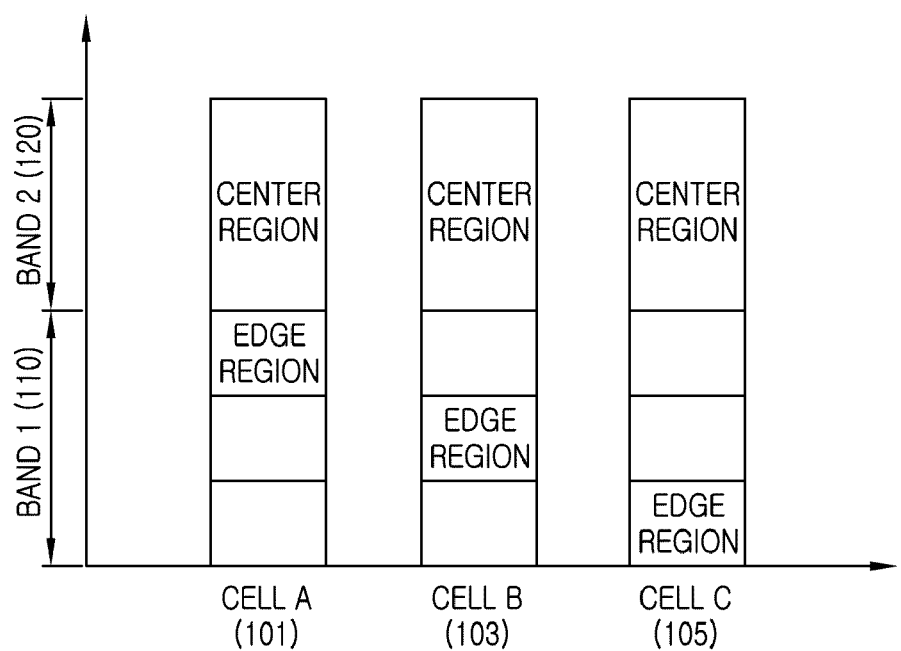
Figure 2A:
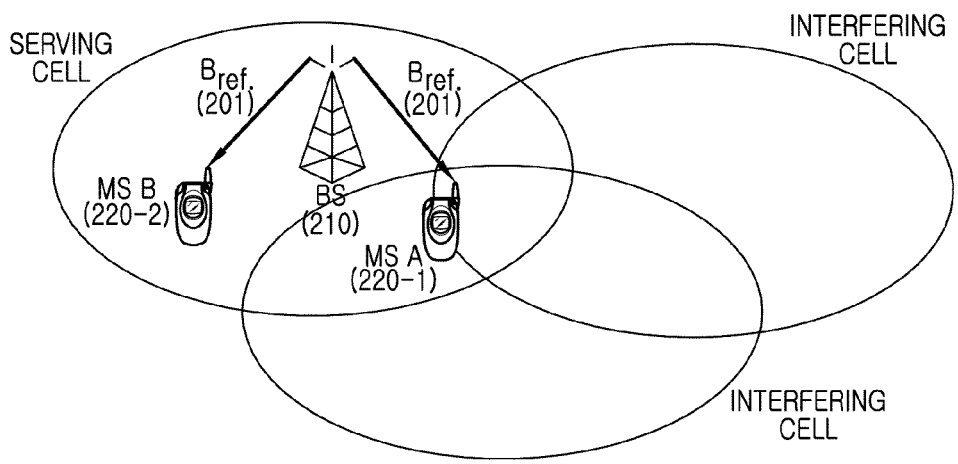
FIGS. 2A to 2C illustrate an example of a signal exchange procedure for determining an FFR region in a broadband wireless communication system according to an exemplary embodiment of the present invention.
Figure 2B:
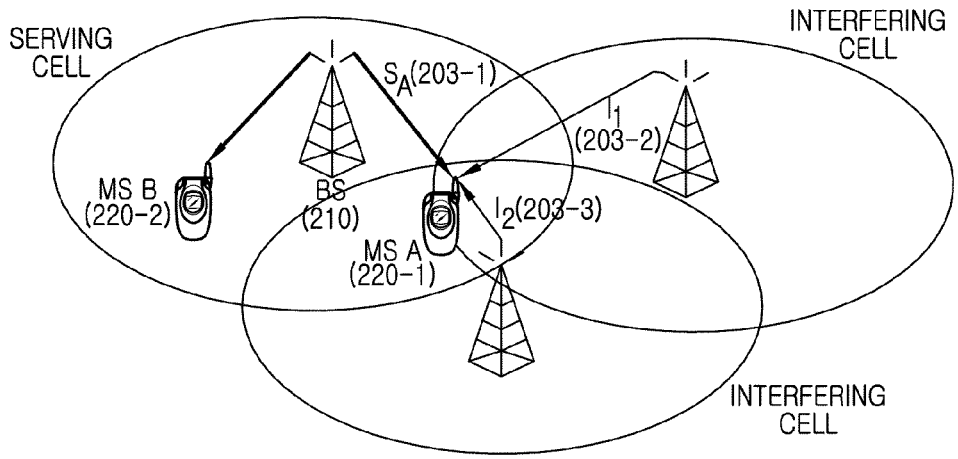
Figure 2C:
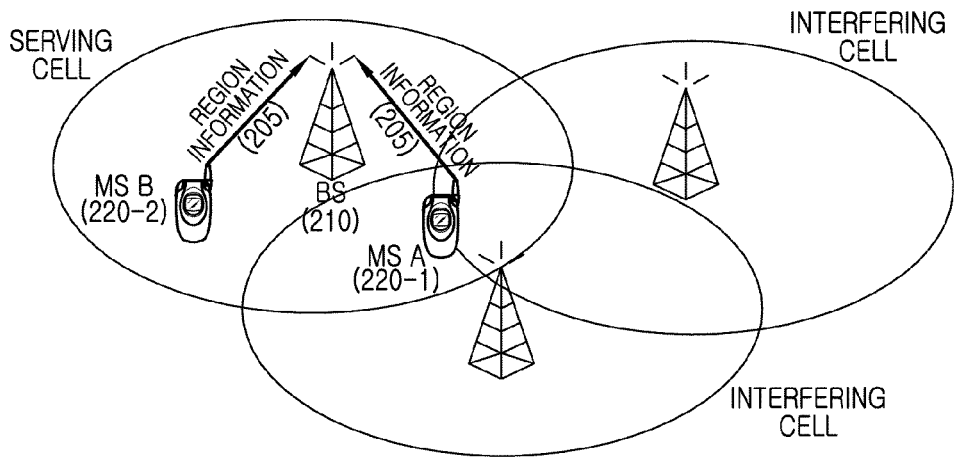

FIGS. 2A to 2C illustrate an example of a signal exchange procedure for determining an FFR region in a broadband wireless communication system according to an exemplary embodiment of the present invention. In FIGS. 2A to 2C, when three cells are adjacent to one another, signals are exchanged among a BS 210, an MS A 220-1 and an MS B 220-2 to determine the FFR region.

Referring to FIG. 2A, the BS 210 broadcasts a reference value $B_{ref}$ 201 to determine the FFR region. For example, the BS 210 broadcasts the reference value $B_{ref}$ 201 through a broadcast channel distinct from a traffic channel, or through the traffic channel by using a broadcasting Connection IDentifier (CID).

Subsequently, as illustrated in FIG. 2B, the MS A 220-1 and the MS B 220-2 receive signals $S_A$ 203-1, $I_1$ 203-2, and $I_2$ 203-3 transmitted from the serving BS 210 and neighbor BSs to gather information required to determine the FFR region. The signals $S_A$ 203-1, $I_1$ 203-2, and $I_2$ 203-3 are signals (e.g., preambles or pilots) that may be used for measurement of path loss or received signal power, and may be concurrently or individually received. That is, the MS A 220-1 and the MS B 220-2 measure the path loss or the received signal power by using predefined signals received from each BS. Further, the MS A 220-1 and the MS B 220-2 determine their regions by using the measured path loss values or received signal power values and the reference value $B_{ref}$ 201 received from the BS 210. In other words, the MS A 220-1 and the MS B 220-2 each determine a region determinant metric by using the path loss values or the received signal power values, and determine their regions by comparing the region determinant metric with the reference value $B_{ref}$ 201.

Thereafter, as illustrated in FIG. 2C, the MS A 220-1 and the MS B 220-2 transmit determined region information 205 to the BS 210. Herein, the region information may consist of one bit since the region information is used only to express whether the region is a center region or an edge region. However, for a more precise decision, the MS A 220-1 and the MS B 220-2 may deliver information consisting of a plurality of bits to the BS 210 so as to express more diversified information.

According to the aforementioned process, the BS 210 may recognize distribution of MSs. In this case, the BS 210 may adjust the reference value $B_{ref}$ 201. If the reference value $B_{ref}$ 201 decreases, the center region is extended. If the reference value $B_{ref}$ 201 increases, the center region is reduced. That is, the BS 210 may adjust a ratio of the center region to the edge region by adjusting the reference value $B_{ref}$ 201. Therefore, the BS 210 optimizes system performance by adjusting the reference value $B_{ref}$ 201 in consideration of a load condition and an interference level with respect to a neighbor cell.

For example, the reference value $B_{ref}$ 201 may be adjusted in the following four cases.

First, if the loading of a cell of the BS 210 is less than a first threshold, the BS 210 increases the reference value $B_{ref}$ 201, and if the loading of the cell of the BS 210 is greater than a second threshold, the BS 210 decreases the reference value $B_{ref}$ 201. That is, if the loading of the cell of the BS 210 is sufficiently small, the BS 210 reduces a center region of the cell to reduce interference to neighbor BSs, thereby improving system performance. In addition, in a case where the loading of the cell of the BS 210 is large, if the center region of the cell is extended, an interference level affecting the neighbor BSs increases whereas the number of MSs, located in the center region of the cell and capable of transmitting a larger amount of loading, increases. Therefore, the BS 210 may support a larger amount of load.

Second, if the distribution of MSs is concentrated in a specific region, the BS 210 optimizes a cell center region and a cell edge region by increasing or decreasing the reference value $B_{ref}$ 201. Herein, whether the distribution of MSs is concentrated is determined by comparing a ratio of the number of MSs for each region with a threshold. That is, if MSs within the cell are concentrated in the cell edge region, that is, if a ratio of the number of MSs in the center region to the number of MSs in the edge region is less than a third threshold, the BS 210 extends a range of the cell center region by decreasing the reference value $B_{ref}$201. Thus, the BS 210 may incorporate some of the MSs located in the cell edge region to the MSs located in the cell center region. Otherwise, if the MSs within the cell are concentrated in the cell center region, that is, if the ratio of the number of MSs in the center region to the number of MSs in the edge region is greater than a fourth threshold, the BS 210 reduces the range of the cell center region by increasing the reference value $B_{ref}$201. Thus, the BS 210 may incorporate some of the MSs located in the cell edge region to the MSs located in the cell center region.

Third, if the interference level of the neighbor cell is greater than a fifth threshold, the BS 210 reduces the center region by increasing the reference value $B_{ref}$ 201, and thus may decrease the interference level of the neighbor cell. Otherwise, if the interference level of the neighbor cell is less than a sixth threshold, the BS 210 increases the number of MSs, located in the cell center region and capable of supporting a larger amount of load, by decreasing the reference value $B_{ref}$ 201, thereby effectively operating system resources.

Fourth, if the loading of the neighbor cell is greater than a seventh threshold, the BS 210 reduces the center region by increasing the reference value $B_{ref}$ 201 and thus allows the neighbor cell to support a larger amount of load by decreasing the interference level of the neighbor cell. In contrast, if the loading of the neighbor cell is less than an eighth threshold, the BS 210 extends the center region by decreasing the reference value $B_{ref}$ 201, thereby effectively managing system resources.

Now, an exemplary method of determining the region determinant metric and a principle for using the method will be described.

The region determinant metric is calculated according to one of Equation (1) to Equation (4) below.

$$K = PL_s - \sum_{i=1}^{J} PL(i) \quad (1)$$

In Equation (1), K denotes a region determinant metric, $PL_s$ denotes a path loss value from a serving BS, PL(i) denotes a path loss value from an $i^{th}$ interfering BS adjacent to a serving cell, and J denotes the number of neighbor BSs considered. The path loss value is generally expressed by a negative value in a dB domain. In addition, the value J is determined to properly set the region determinant metric K by a user or one who implements the present invention.

In Equation (1), a neighbor BS having a greatest value among the negative path loss values (i.e., i=1) is a most adjacent interfering BS. The larger the value i, the smaller the interference level of the interfering BS, i.e., the smaller the value of the BS among the negative path loss values.

$$K = \frac{PL_s}{\sum_{i=1}^{j} PL(i)} \quad (2)$$

In Equation (2), K denotes a region determinant metric, $PL_s$ denotes a path loss value from a serving BS, PL(i) denotes a path loss value from an $i^{th}$ interfering BS adjacent to a serving cell, and J denotes the number of neighbor BSs considered. In addition, the value J is determined to properly set the region determinant metric K by a user or one who implements the present invention.

Elements of Equation (2) are the same as those of Equation (1), except that $PL_s$ and PL(i) of Equation (2) are values obtained by converting dB-domain values of Equation (1) into linear-domain values, and the region determinant metric K is a ratio of the path loss value from the serving BS to a sum of path loss values of neighbor interfering BSs.

$$K = \frac{P_{PXserving}}{\sum_{i=1}^{J} P_{RXinterference}(i)} \quad (3)$$

In Equation (3), K denotes a region determinant metric, $P_{RXserving}$ denotes a received signal power value from a serving BS, $P_{RXinterference}(i)$ denotes a received interference power value from an $i^{th}$ interfering BS adjacent to a serving cell, and J denotes the number of neighbor BSs considered. Herein, the value J is determined to properly set the region determinant metric K by a user or one who implements the present invention.

According to Equation (3), the region determinant metric K is a ratio of received power from the serving BS to a sum of received power values from J neighbor interfering BSs.

$$K = \frac{P_{PXserving}}{\sum_{i=1}^{I} P_{RXinterference}(i) + P_{noise}} \quad (4)$$

In Equation (4), K denotes a region determinant metric, $P_{RXserving}$ denotes a received signal power value from a serving BS, $P_{RXinterference}(i)$ denotes a received interference power value from an $i^{th}$ interfering BS adjacent to a serving cell, $P_{noise}$ denotes a noise power value measured by an MS, and I denotes the number of all interfering BSs.

According to Equation (4), the region determinant metric K is the same concept as a Carrier to Interference and Noise Ratio (CINR) or a Signal to Interference and Noise Ratio (SINR) received by the MS in a downlink system.

The region determinant metric determined by Equation (1) to Equation (4) is a value indicating a path loss difference (or ratio) between the serving BS and neighbor interfering BSs or a value indicating a ratio of received signal power values. Therefore, if the region determinant metric is less than a threshold, this implies that a difference of path loss values of the serving BS and the neighbor interfering BSs or the ratio of received signal power values is small, and thus it may be determined that the MS is located in a cell edge region. In contrast, if the region determinant metric is greater than the threshold, it may be determined that the MS is located in a cell center region.

In Equation (1) to Equation (3), the value J is used to determine a proper FFR region, and may be set to any value.

Figure 3A:
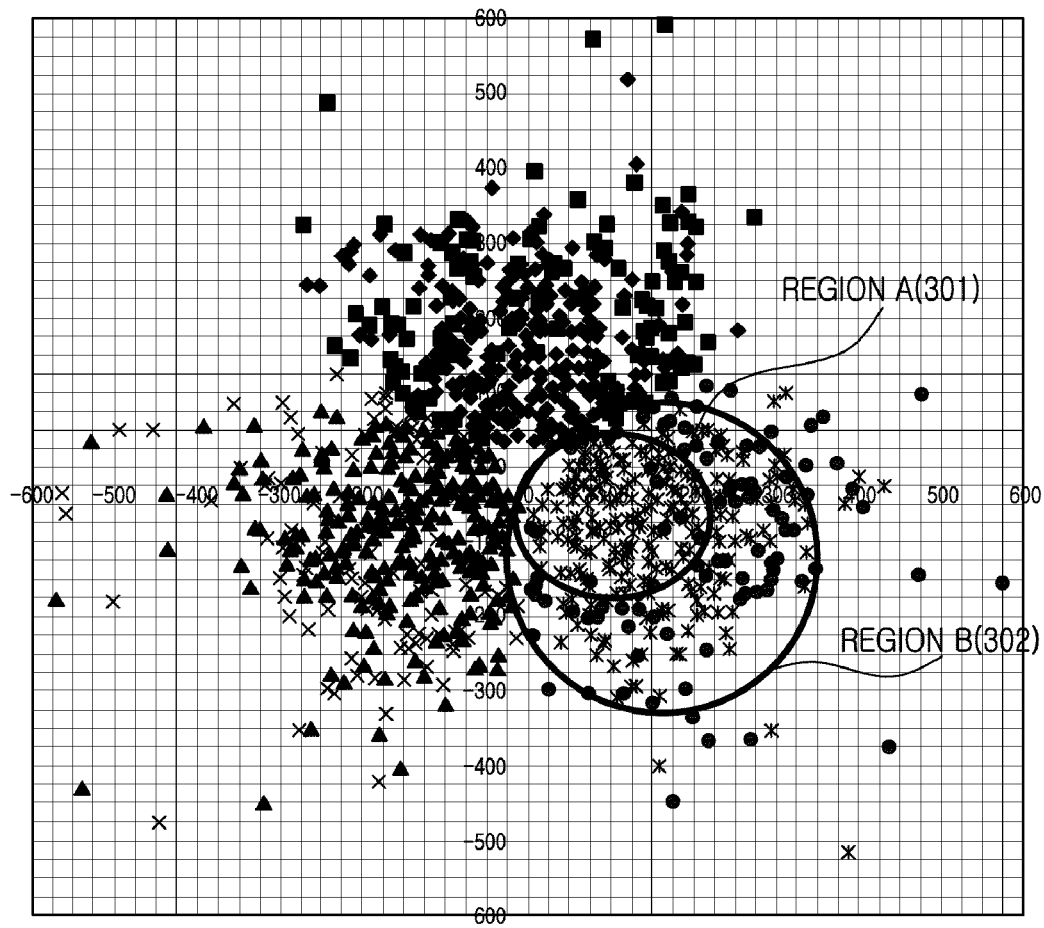
FIG. 3A to FIG. 3C illustrate a result of a simulation for determining a region in a broadband wireless communication system according to an exemplary embodiment of the present invention.
Figure 3B:
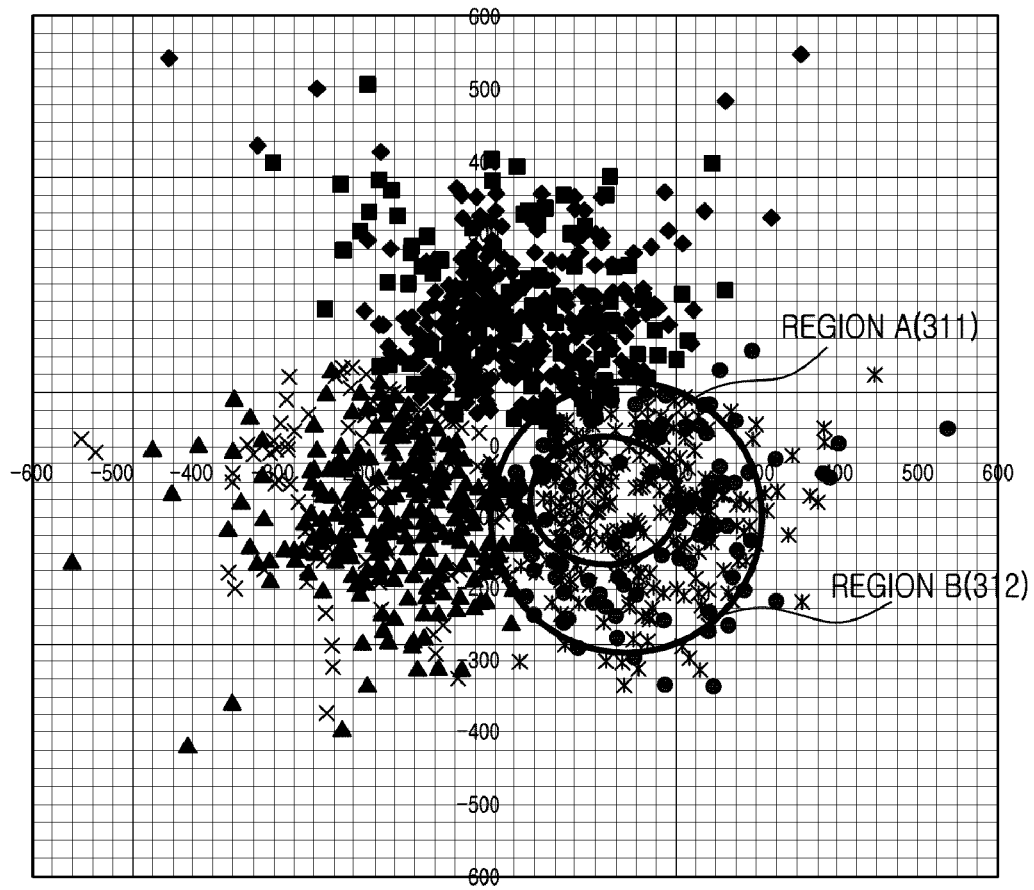
Figure 3C:
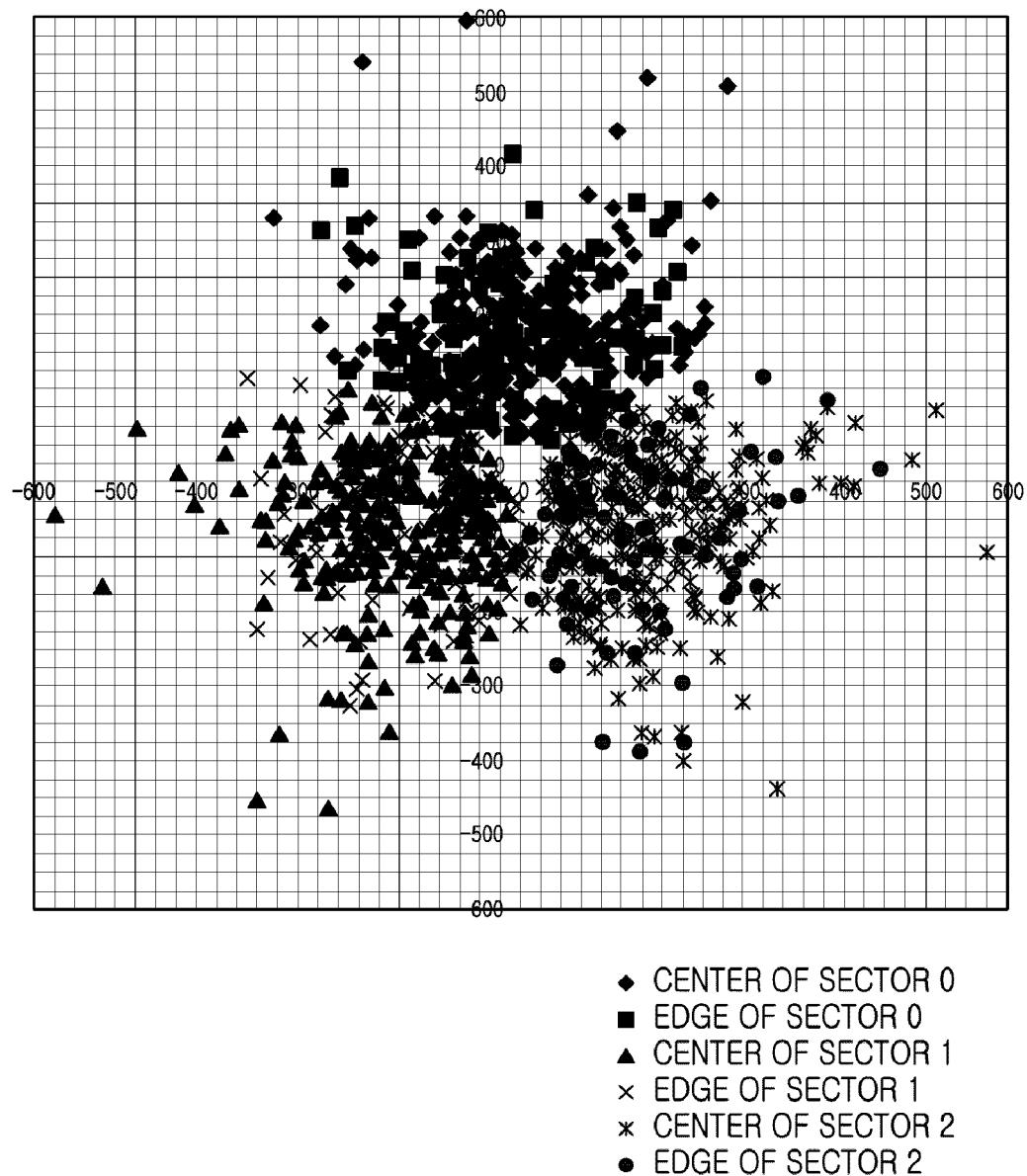

FIG. 3A to FIG. 3C illustrate a simulation for determining a region in a broadband wireless communication system according to an exemplary embodiment of the present invention.

Referring to FIG. 3A to FIG. 3C, a distance is not an absolute distance but a relative distance depending on a path loss. In other words, the pass loss depends on a component proportional to a distance and a random component based on a shadow, and thus may be proportional to a distance in a probability sense. The pass loss may have any value irrespective of the distance. Therefore, as illustrated in FIG. 3A to FIG. 3C, MSs may be distributed in regular positions.

FIG. 3A illustrates a simulation result obtained when the value J is set to 2 according to a sum of path loss values of two cells most adjacent or two cells having a smallest path loss and according to a difference between path loss values of a serving cell. Referring to FIG. 3A, a cell center region A 301 and a cell edge region B 302 are distributed apart from each other by a specific distance.

FIG. 3B illustrates a simulation result when the value J is set to 1, that is, when only a most adjacent cell or a cell having a smallest path loss is considered. Referring to FIG. 3B, MSs determined to be located in the cell center region are distributed in a region A 311, and MSs determined to be located in the cell edge region are distributed in a region B 312. In this case, whether MSs are distributed in the region A 311 or the region B 312 is unclear in some areas. This is because, since two adjacent cells have similar path loss values, a path loss value of one neighbor cell is relatively small while a sum of the two path loss values results in large interference, and thus the MSs are determined to be located in the region A 311 instead of the region B 312.

FIG. 3C illustrates a simulation result when the value J is set to 5, that is, when unnecessary interfering BSs are also considered in addition to necessary interfering BSs. Referring to FIG. 3C, by considering the unnecessary interfering BSs, distinction between a primary interfering cell and a secondary interfering cell is unclear. Accordingly, a center region and an edge region may not be determined.

Therefore, when considering the simulation result of FIG. 3A to FIG. 3C, the value J is preferably set to 2, 3, or 4.

Hereinafter, an exemplary operation and structure of a BS and an MS for determining an FFR region will be described in detail with reference to the accompanying drawings.

Figure 4:
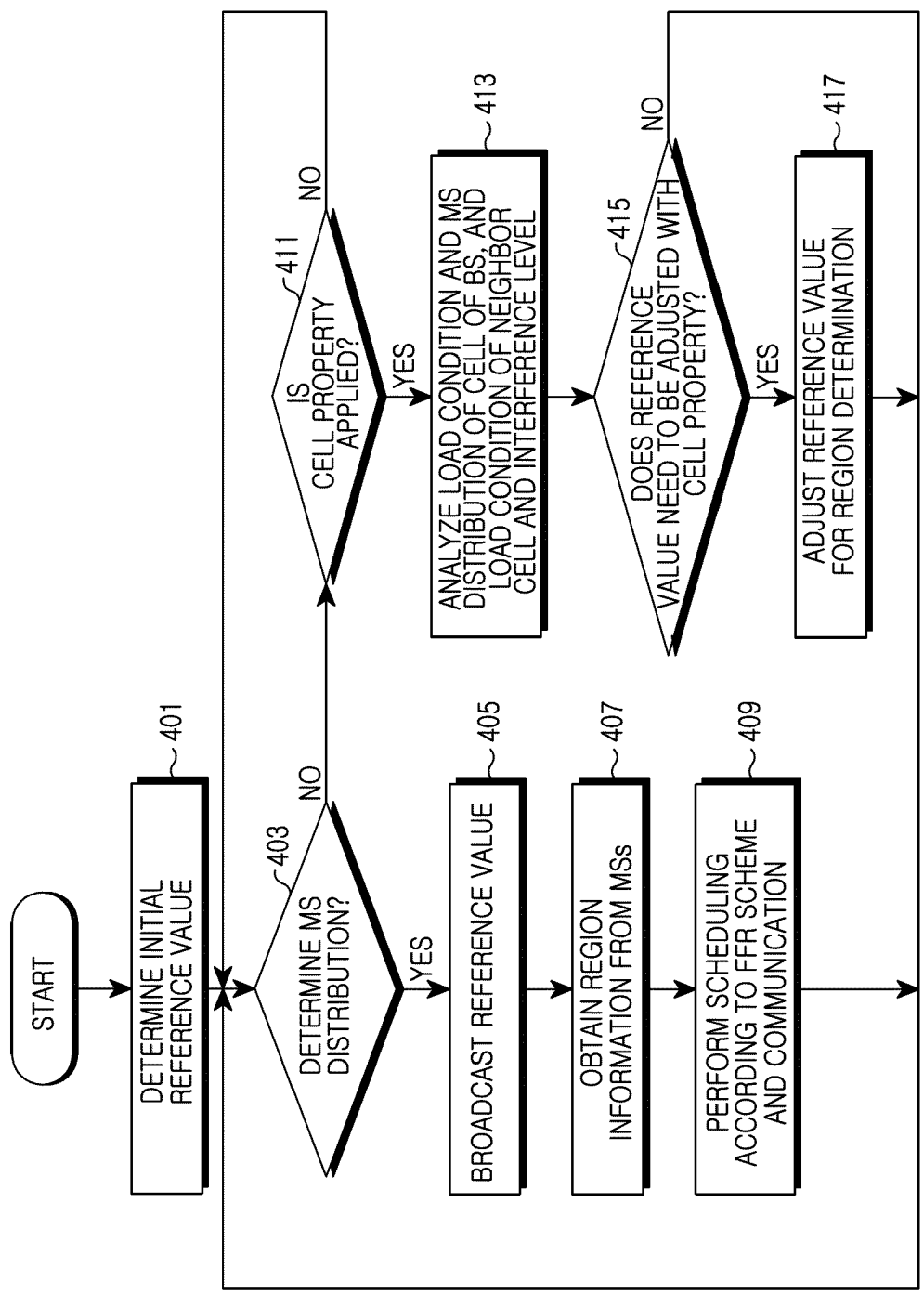
FIG. 4 is a flowchart illustrating an operation of a Base Station (BS) in a broadband wireless communication system according to an exemplary embodiment of the present invention.

FIG. 4 is a flowchart illustrating an operation of a BS in a broadband wireless communication system according to an exemplary embodiment of the present invention.

Referring to FIG. 4, the BS determines an initial reference value in step 401. The initial reference value is determined based on received signal strength and path loss values, fed back from MSs within a cell, for a serving BS and/or received signal strength and path loss values for neighbor BSs. That is, the BS gathers the received signal strength and path loss values, fed back from the MSs within the cell, for the serving BS and the received signal strength and path loss values for the neighbor BSs, and determines the initial reference value. In this case, information required to determine the initial reference value is used to obtain statistical data, and is fed back throughout a significantly and relatively longer period than other periods described below, thereby avoiding a large overhead.

In step 403, the BS determines whether a distribution of the MSs needs to be determined. That is, to use the FFR scheme, the BS periodically evaluates the distribution of the MSs within the cell according to a first time interval.

If the distribution of the MSs needs to be determined in the current period, in step 405 the BS broadcasts reference values. In this step, the BS broadcasts a reference value for region determination through a broadcast channel, or through a traffic channel by using a broadcasting CID.

After broadcasting the reference value for region determination, in step 407 the BS obtains region information of the MSs within the cell. That is, the BS receives and evaluates MS region information determined by the MSs. Herein, the region information indicates whether a specific MS is located in a center region or an edge region.

After obtaining the region information of the MSs, in step 409 the BS performs scheduling according to the FFR scheme and communication. That is, the BS determines a communication band of each MS by using the region information received from each MS. In other words, the BS allocates resources in a band set to a reuse rate of '1' to MSs located in the center region, and allocates resources in a band set to a reuse rate of 'N' to MSs located in the edge region, and thereafter performs communication according to the allocation result. Herein, N denotes a value determined according to a cell distribution, and is an integer greater than or equal to 2.

If the MS distribution is not determined in the current period in step 403, in step 411 the BS determines whether a cell property is applied to the reference value. That is, the BS considers whether the cell property is adaptively adjusted for the reference value periodically according to a second time interval.

If the cell property is applied in the current period, in step 413 the BS analyzes a load condition of a cell of the BS, an interference level of the cell of the BS, an MS distribution of the cell of the BS, a load condition of a neighbor cell, and an interference level of the neighbor cell. Herein, the load condition of the cell of the BS and an uplink interference level belonging to the interference level of the cell of the BS are directly measured by the BS. A downlink interference level belonging to the interference level of the cell of the BS is measured by feedback information of the MSs. The MS distribution of the cell of the BS is measured according to step 405 and step 409. In addition, the load condition of the neighbor cell and the interference level of the neighbor cell are obtained by performing backbone communication with neighbor BSs. That is, the BS measures the uplink interference level and the load condition of the current cell of the BS, evaluates MS distribution information recently determined and downlink interference level information fed back from the MSs, and receives load condition information and interference level information from the neighbor BSs.

In step 415, the BS determines whether the reference value needs to be adjusted by the cell property according to the analyzed information. In other words, the BS determines whether a current situation satisfies a condition for adjusting the reference value. For example, the BS determines whether the current situation corresponds to one of the four cases described above with reference to FIGS. 2A to 2C. More specifically, the BS determines whether the loading of the cell of the BS is less than a first threshold, whether the loading of the cell of the BS is greater than a second threshold, whether a ratio of the number of MSs in the center region to the number of MSs in the edge region is less than a third threshold, whether the ratio of the number of MSs in the center region to the number of MSs in the edge region is greater than a fourth threshold, whether the interference level of the neighbor cell is greater than a fifth threshold, whether the interference level of the neighbor cell is less than a sixth threshold, whether the loading of the neighbor cell is greater than a seventh threshold, or whether the loading of the neighbor cell is less than an eighth threshold. In this case, one or more conditions may be satisfied among the conditions listed above. If it is determined that adjustment of the reference value is unnecessary, the procedure returns to step 403.

In contrast, if it is determined that adjustment of the reference signal is necessary, for example, if one of the conditions listed above is satisfied, in step 417 the BS adjusts the reference value for region determination. In this case, adjustment of the reference value implies increasing or decreasing of the reference value, and the reference value increases or decreases according to which condition is satisfied. For example, the BS decreases the reference value if the loading of the cell of the BS is less than the first threshold, or if the ratio of the number of MSs in the center region to the number of MSs in the edge region is less than the third threshold, or if the interference level of the neighbor cell is less than the sixth threshold, or if the loading of the neighbor cell is less than the eighth threshold. On the other hand, the BS increases the reference value if the loading of the cell of the BS is greater than the second threshold, or if the ratio of the number of MSs in the center region to the number of MSs in the edge region is greater than the fourth threshold, or if the interference level of the neighbor cell is greater than the fifth threshold, or if the loading of the neighbor cell is greater than the seventh threshold.

Figure 5:
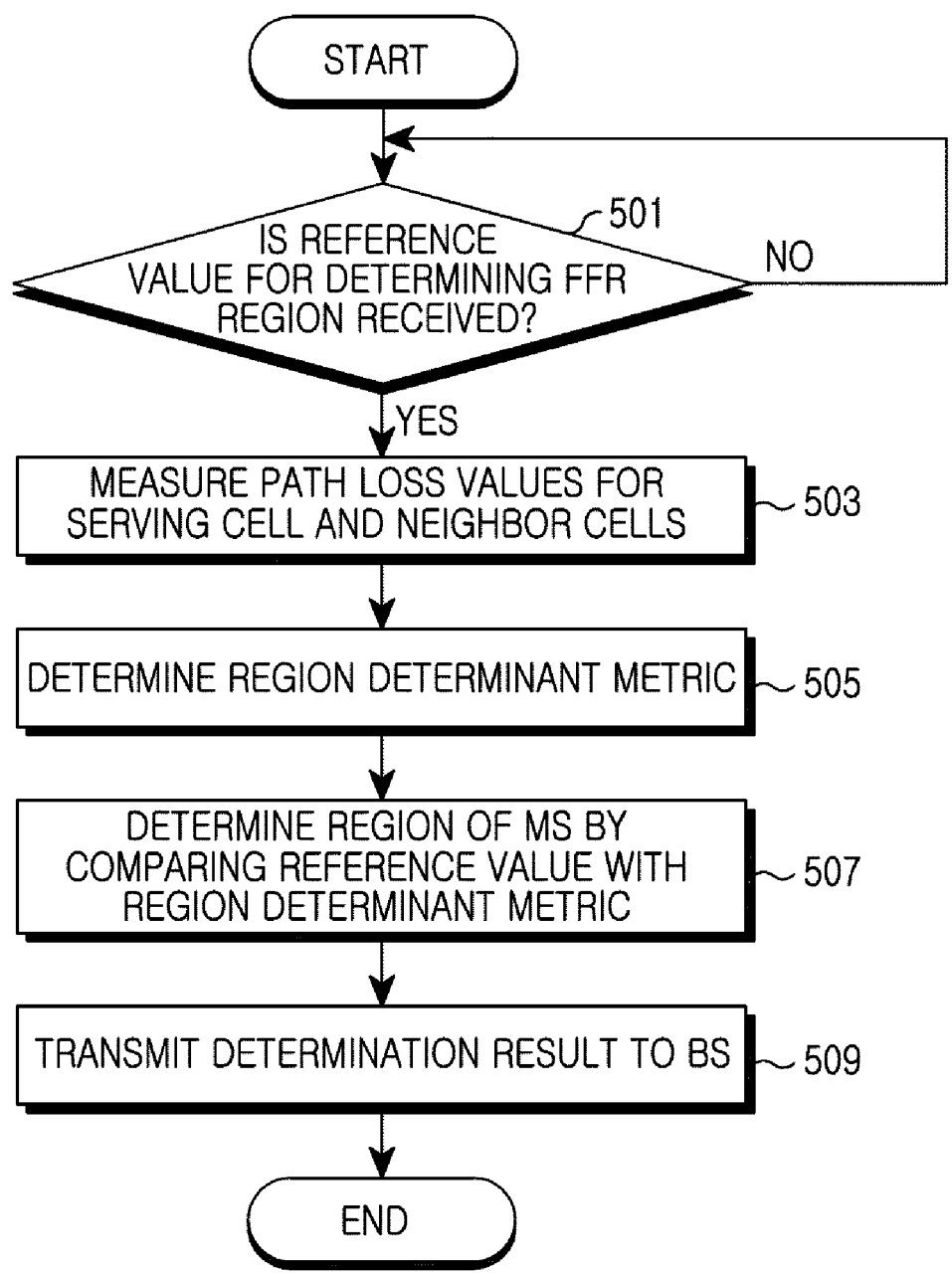
FIG. 5 illustrates an operation of a Mobile Station (MS) in a broadband wireless communication system according to an exemplary embodiment of the present invention.

FIG. 5 illustrates an operation of an MS in a broadband wireless communication system according to an exemplary embodiment of the present invention.

Referring to FIG. 5, the MS determines whether a reference value for determining an FFR region is received from a BS in step 501. Herein, the reference value for determining the FFR region may be received through a broadcast channel, or through a traffic channel by using a broadcasting CID.

Upon receiving the reference value for determining the FFR region, in step 503 the MS measures path loss values for a serving cell and neighbor cells. In other words, the MS measures a path loss value for each cell by using a signal (e.g., a preamble, a pilot, or the like) received from a serving BS and neighbor BSs. In this case, the path loss values are measured to determine a region determinant metric. The use of the path loss values to determine the region determinant metric is for exemplary purposes only. Thus, according to another exemplary implementation, received signal strength values may be used instead of the path loss values. In this case, the MS measures the received signal strength values for the serving cell and the neighbor cells.

In step 505, the MS determines the region determinant metric by using the measured path loss values. That is, the MS determines the region determinant metric by subtracting a sum of the path loss values for the neighbor cells from the path loss value of the serving cell. However, according to another exemplary implementation, the MS determines the region determinant metric by using the received signal strength values. For example, the region determinant metric is one of a difference between the path loss values for the serving cell and the neighbor cells, a ratio of the path loss values, a ratio of the received signal strength values, and a ratio of the received signal strength values and noise power, and is determined according to one of Equation (1) to Equation (4) above. However, by intentions of those who implement the present invention, the number of neighbor cells considered in the determination of the region determinant metric may be limited. For example, among a plurality of neighbor cells, path loss values and received signal strength values may be considered only for 2, 3, or 4 neighbor cells which produce the greatest interference.

After determining the region determinant metric, in step 507 the MS compares the reference value received in step 501 with the region determinant metric determined in step 505, and determines a region of the MS according to the comparison result. For example, the MS determines that the region of the MS is an edge region if the reference value is greater than the region determinant metric, and determines that the region of the MS is a center region if the reference value is less than or equal to the region determinant metric.

After determining the region of the MS, in step 509 the MS transmits the determination result to the BS. In this case, the determination result is transmitted in the form of information consisting of one bit. However, for a more precise decision, the MS may transmit the determination result information consisting of a plurality of bits to the BS so as to express more diversified information. Accordingly, the BS adaptively determines the reference value by using the diversified information.

Figure 6:
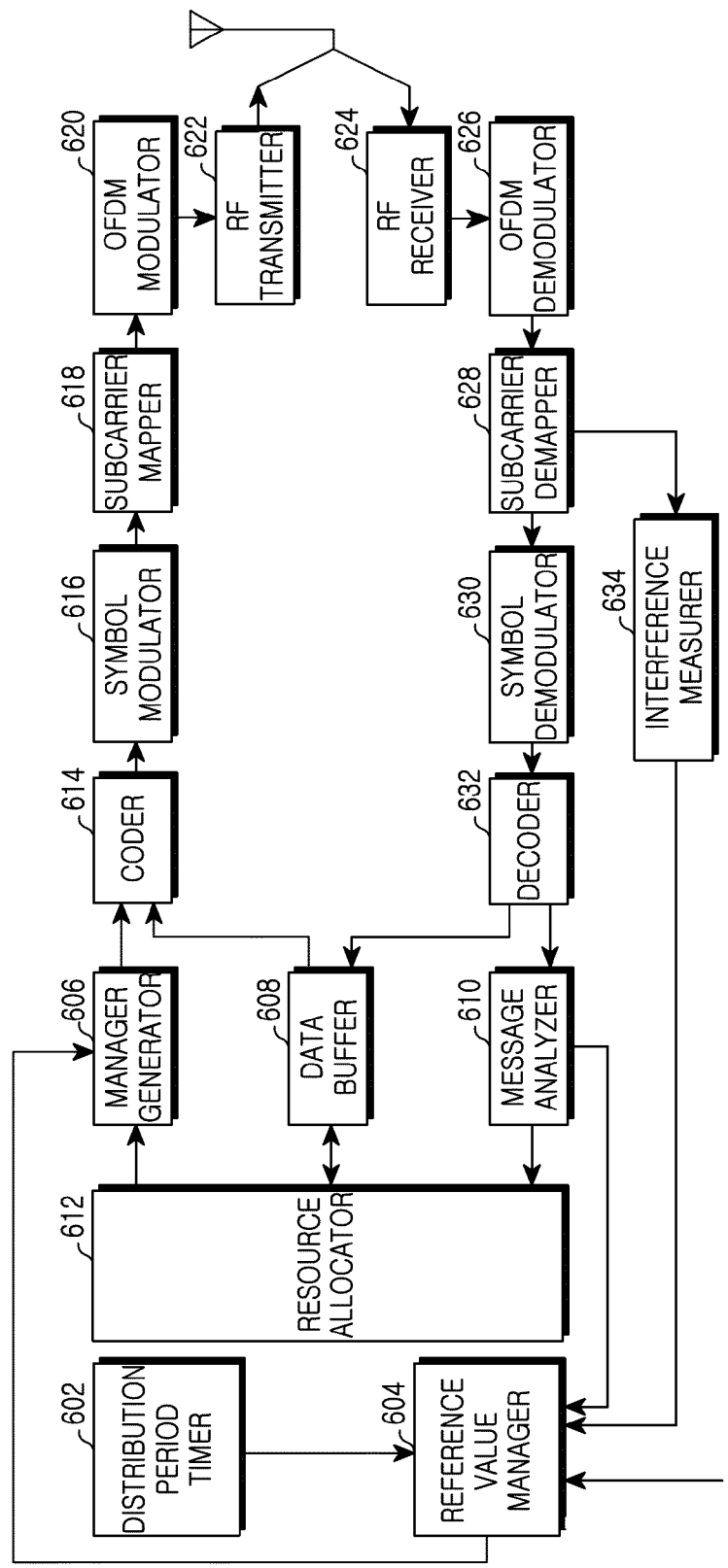
FIG. 6 is a block diagram illustrating a structure of a BS in a broadband wireless communication system according to an exemplary embodiment of the present invention.

FIG. 6 is a block diagram illustrating a structure of a BS in a broadband wireless communication system according to an exemplary embodiment of the present invention.

Referring to FIG. 6, the BS includes a distribution period timer 602, a reference value manager 604, a manager generator 606, a data buffer 608, a message analyzer 610, a resource allocator 612, a coder 614, a symbol modulator 616, a subcarrier mapper 618, an OFDM modulator 620, a Radio Frequency (RF) transmitter 622, an RF receiver 624, an OFDM demodulator 626, a subcarrier demapper 628, a symbol demodulator 630, a decoder 632, and an interference measurer 634.

The distribution period timer 602 evaluates a period for determining distribution of MSs to use the FFR scheme. That is, distribution of MSs located in a cell is periodically evaluated for the FFR scheme according to a first time interval. When the period for distribution determination arrives, the distribution period timer 602 reports the arrival of the period to the reference value manager 604.

The reference value manager 604 determines an initial reference value, determines whether the reference value needs to be periodically adjusted by the cell property according to a second time interval, and thereafter, if it is determined that adjustment is necessary, adjusts the reference value. That is, the reference value manager 604 gathers the received signal strength and path loss values, fed back from the MSs within the cell, for the serving BS and the received signal strength and path loss values for the neighbor BSs, and determines the initial reference value. When the period for determining whether the reference value needs to be adjusted, the reference value manager 604 gathers and analyzes information such as a load condition of a cell of the BS, an interference level of the cell of the BS, an MS distribution of the cell of the BS, a load condition of a neighbor cell, and an interference level of the neighbor cell, and thereafter determines whether the reference value needs to be adjusted by the cell property according to the analyzed information. In other words, reference value manager 604 determines whether a current situation satisfies a condition for adjusting the reference value. For example, the reference value manager 604 determines whether the current situation corresponds to one of the four cases described above with reference to FIGS. 2A to 2C. More specifically, the reference value manager 604 determines whether the loading of the cell of the BS is less than a first threshold, whether the loading of the cell of the BS is greater than a second threshold, whether a ratio of the number of MSs in the center region to the number of MSs in the edge region is less than a third threshold, whether the ratio of the number of MSs in the center region to the number of MSs in the edge region is greater than a fourth threshold, whether the interference level of the neighbor cell is greater than a fifth threshold, whether the interference level of the neighbor cell is less than a sixth threshold, whether the loading of the neighbor cell is greater than a seventh threshold, or whether the loading of the neighbor cell is less than an eighth threshold.

In contrast, if it is determined that adjustment of the reference signal is necessary, for example, if one of the conditions listed above is satisfied, the reference value manager 604 adjusts the reference value for region determination. In this case, adjustment of the reference value implies increasing or decreasing of the reference value, and the reference value increases or decreases according to which condition is satisfied. For example, the reference value manager 604 decreases the reference value if the loading of the cell of the BS is less than the first threshold, if the ratio of the number of MSs in the center region to the number of MSs in the edge region is less than the third threshold, if the interference level of the neighbor cell is less than the sixth threshold, or if the loading of the neighbor cell is less than the eighth threshold. On the other hand, the reference value manager 604 increases the reference value if the loading of the cell of the BS is greater than the second threshold, if the ratio of the number of MSs in the center region to the number of MSs in the edge region is greater than the fourth threshold, if the interference level of the neighbor cell is greater than the fifth threshold, or if the loading of the neighbor cell is greater than the seventh threshold.

The manager generator 606 generates a control message to be transmitted to the MS. In particular, the manager generator 606 generates the control message for broadcasting the reference value for region determination provided from the reference value manager 604. If the reference value for region determination is transmitted through a traffic channel, the manager generator 606 appends a broadcasting CID to the control message including the reference value for region determination.

The data buffer 608 stores data to be transmitted to the MS and data received from the MS. Further, the data buffer 608 outputs the stored data according to a resource allocation result of the resource allocator 612.

The message analyzer 610 analyzes the control message received from the MS. In particular, the message analyzer 610 evaluates MS region information determined by the MS by using the control message received from the MS. That is, the message analyzer 610 evaluates a value indicating whether the MS is located in a center region or an edge region by analyzing the control message, and provides the evaluated value to the resource allocator 612.

The resource allocator 612 allocates resources to MSs. In particular, the resource allocator 612 allocates the resources according to the FFR scheme. That is, the resource allocator 612 identifies MSs located in the center region and MSs located in the edge region according to the MS region information evaluated by the message analyzer 610, and determines a communication band of each MS. In other words, the resource allocator 612 allocates resources in a band set to a reuse rate of '1' to MSs located in the center region, and allocates resources in a band set to a reuse rate of 'N' to MSs located in the edge region. Herein, N denotes a value determined according to a cell distribution, and is an integer equal to or greater than 2.

The coder 614 performs channel coding on information bit-streams provided from the manager generator 606 and the data buffer 608. The symbol modulator 616 modulates the channel-coded bit-streams to convert the bit-streams into complex symbols. The subcarrier mapper 618 maps the complex symbols to a frequency domain according to the resource allocation result of the resource allocator 612. The OFDM modulator 620 converts the complex symbols mapped to the frequency domain by performing an Inverse Fast Fourier Transform (IFFT) operation, and configures an OFDM symbol by inserting a Cyclic Prefix (CP). The RF transmitter 622 up-converts a baseband signal into an RF signal and transmits the RF signal through an antenna.

The RF receiver 624 down-converts the RF signal received through the antenna into a baseband signal. The OFDM demodulator 626 divides a signal provided from the RF receiver 624 in an OFDM symbol unit, removes the CP, and restores the complex symbols mapped to the frequency domain by performing a Fast Fourier Transform (FFT) operation. The subcarrier demapper 628 divides the complex symbols mapped to the frequency domain in a processing unit. That is, the subcarrier demapper 628 provides a signal for measuring interference of a neighbor cell to the interference measurer 634, and provides a traffic signal and a control message signal to the symbol demodulator 630. The symbol demodulator 630 converts the complex symbols into bit-streams. The decoder 632 performs channel decoding on the bit-streams to restore the information bit-streams. The interference measurer 634 measures uplink interference from the neighbor cell by using a signal received from the neighbor cell.

Figure 7:
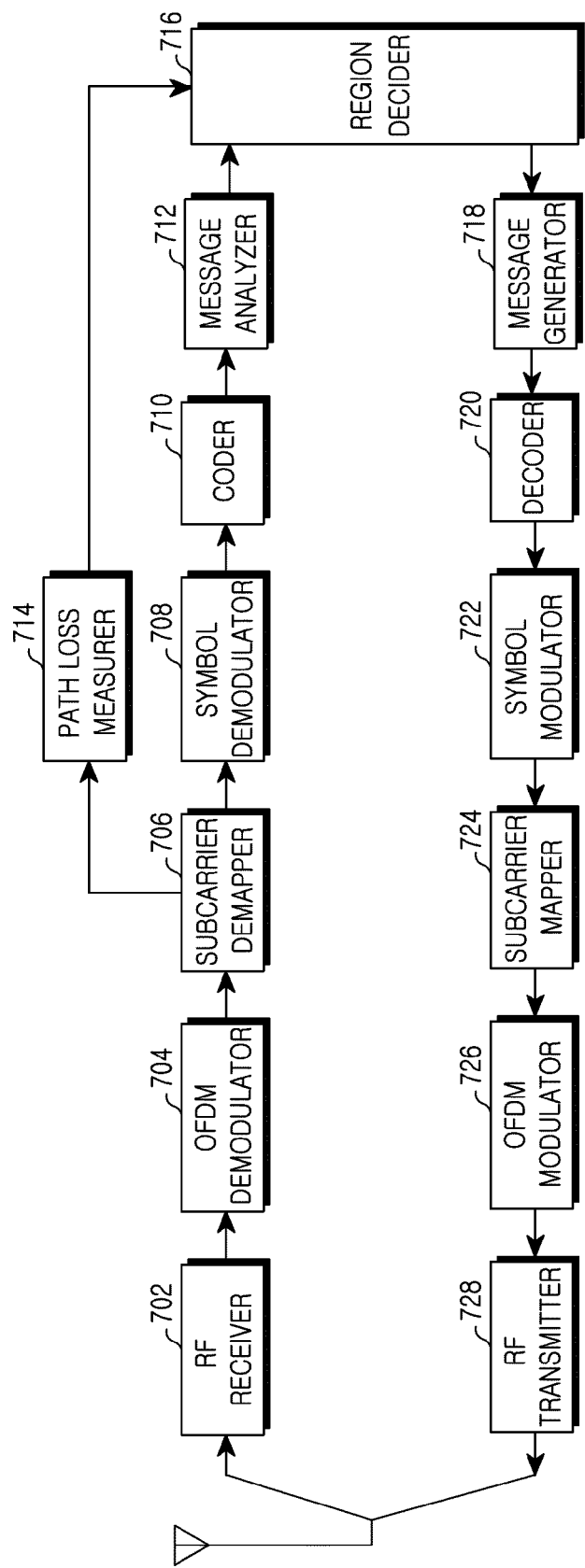
FIG. 7 is a block diagram illustrating a structure of an MS in a broadband wireless communication system according to an exemplary embodiment of the present invention.

FIG. 7 is a block diagram illustrating a structure of an MS in a broadband wireless communication system according to an exemplary embodiment of the present invention.

Referring to FIG. 7, the MS includes an RF receiver 702, an OFDM demodulator 704, a subcarrier demapper 706, a symbol demodulator 708, a coder 710, a message analyzer 712, a path loss measurer 714, a region determinator 716, a message generator 718, a coder 720, a symbol modulator 722, a subcarrier mapper 724, an OFDM modulator 726, and an RF transmitter 728.

The RF receiver 702 down-converts an RF signal received through an antenna into a baseband signal. The OFDM demodulator 704 divides a signal provided from the RF receiver 702 in an OFDM symbol unit, removes a CP, and restores complex symbols mapped to a frequency region by performing an FFT operation. The subcarrier demapper 706 divides signals in a processing unit, wherein the signals are mapped to resources allocated to the MS among the complex symbols mapped to the frequency band. That is, the subcarrier demapper 706 provides a signal (e.g., a preamble and a pilot) for channel quality measurement to the path loss measurer 714, and provides a traffic signal and a control message signal to the symbol demodulator 708. The symbol demodulator 708 modulates the complex symbols to convert the complex symbols into bit-streams. The coder 720 performs channel decoding on the bit-streams to restore information bit-streams.

The message analyzer 712 analyzes the control message received from a BS. In particular, the message analyzer 712 evaluates a reference value for region determination by analyzing a control message broadcast by the BS. Herein, the broadcast control message includes a control message broadcast through a broadcasting channel and a control message broadcast through a traffic channel by using a broadcasting CID.

The path loss measurer 714 measures path loss values for a serving cell and neighbor cells. That is, the path loss measurer

714 measures a path loss value for each cell by using a signal (e.g., a preamble, a pilot, or the like) received from a serving BS and neighbor BSs. In this case, the path loss values are measured to determine a region determinant metric. The use of the path loss values to determine the region determinant metric is for exemplary purposes only. Thus, according to another exemplary implementation, received signal strength values may be used instead of the path loss values. In this case, the path loss measurer 714 measures the received signal strength values for the serving cell and the neighbor cells.

The region decider 716 determines a region to which the MS belongs by using the reference value for region determination provided from the message analyzer 712 and the path loss values (or received signal strength values), provided from the path loss measurer 714, for the serving cell and the neighbor cells. In other words, the region decider 716 calculates a region determinant metric by using the path low values (or received signal strength values) for the serving cell and the neighbor cells, and determines the region to which the MS belongs by comparing the region determinant metric with the reference value.

For example, when the path loss values are used, the region decider 716 determines the region determinant metric by subtracting a sum of the path loss values for the neighbor cells from the path loss value of the serving cell. However, according to another exemplary implementation, the region decider 716 determines the region determinant metric by using the received signal strength values. For example, the region determinant metric is one of a difference between the path loss values for the serving cell and the neighbor cells, a ratio of the path loss values, a ratio of the received signal strength values, and a ratio of the received signal strength values and noise power, and is determined according to one of Equation (1) to Equation (4) above. However, by intentions of those who implement the present invention, the number of neighbor cells considered in the determination of the region determinant metric may be limited. For example, among a plurality of neighbor cells, path loss values and received signal strength values may be considered only for 2, 3, or 4 neighbor cells which produce the greatest interference. Further, the region decider 716 compares the reference value for region determination with the region determinant metric, and determines a region of the MS according to the comparison result. For example, the region decider 716 determines that the region of the MS is an edge region if the reference value for region determination is greater than the region determinant metric, and determines that the region of the MS is a center region if the reference value for region determination is less than or equal to the region determinant metric. Further, the region decider 716 reports the region determination result to the message generator 718.

The message generator 718 generates control messages to be transmitted to the BS. In particular, the message generator 718 generates a control message for reporting the MS region determined by the region decider 716. In this case, information for reporting the MS region consists of one bit. However, for a more precise decision, the message generator 718 may generate determination result information consisting of a plurality of bits to express more diversified information. Accordingly, the BS adaptively determines the reference value by using the specified information.

The coder 720 performs channel coding on information bit-streams provided from the message generator 718. The symbol modulator 722 modulates the channel-coded bit-streams to convert the bit-streams into complex symbols. The subcarrier mapper 724 maps the complex symbols to a frequency domain. The OFDM modulator 726 converts the complex symbols mapped to the frequency domain by performing an IFFT operation, and configures an OFDM symbol by inserting a CP. The RF transmitter 728 up-converts a baseband signal into an RF signal, and transmits the RF signal through an antenna.

According to exemplary embodiment of the present invention, a Fractional Frequency Reuse (FFR) scheme is used to determine whether a Mobile Station (MS) is located in a center region or an edge region. Therefore, an FFR region may be determined correctly with a small overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of operating a Base Station (BS) supporting a Fractional Frequency Reuse (FFR) scheme in a wireless communication system, the method comprising:
   broadcasting a reference value for determining an FFR region;
   receiving region information determined by using the reference value from at least one Mobile Station (MS);
   determining a communication band of at least one MS by using the region information received from the at least one MS; and
   allocating resources in the determined communication band to the at least one MS,
   wherein the reference value corresponds to a ratio of an area of a center region of a cell of the BS to an area of an edge region of the cell of the BS.

2. The method of claim 1, wherein the region information consists of one bit.

3. The method of claim 1, wherein the determining of the communication band of the at least one MS comprises:
   determining a location of the at least one MS to one of the center region and the edge region according to the region information;
   allocating a resource within a band set to a reuse rate of '1' to an MS located in the center region; and
   allocating a resource within a band set to a reuse rate of 'N' to an MS located in the edge region.

4. The method of claim 1, wherein the reference value is broadcast through one of a broadcast channel and a traffic channel in a form of a message including a broadcasting Connection IDentifier (CID).

5. The method of claim 1, further comprising:
   adjusting the reference value according to at least one of a load condition of a cell of the BS, an interference level of the cell of the BS, an MS distribution of the cell of the BS, a load condition of at least one neighbor cell, and an interference level of the at least one neighbor cell.

6. The method of claim 5, wherein the adjusting of the reference value comprises:
   decreasing the reference value if the loading of the cell of the BS is less than a first threshold; and
   increasing the reference value if the loading of the cell of the BS is greater than a second threshold.

7. The method of claim 5, wherein the adjusting of the reference value comprises:
   decreasing the reference value if the ratio of the number of MSs in the center region to the number of MSs in the edge region is less than a third threshold; and
   increasing the reference value if the ratio of the number of MSs in the center region to the number of MSs in the edge region is greater than a fourth threshold.

8. The method of claim 5, wherein the adjusting of the reference value comprises:
increasing the reference value if the interference level of the neighbor cell is greater than a fifth threshold; and
decreasing the reference value if the interference level of the neighbor cell is less than a sixth threshold.

9. The method of claim 5, wherein the adjusting of the reference value comprises:
increasing the reference value if the loading of the neighbor cell is greater than a seventh threshold; and
decreasing the reference value if the loading of the neighbor cell is less than an eighth threshold.

10. A method of operating a Mobile Station (MS) supporting a Fractional Frequency Reuse (FFR) scheme in a wireless communication system, the method comprising:
receiving a reference value for determining an FFR region from a Base Station (BS);
measuring one of path loss values and received signal strength values for a serving cell and at least one neighbor cell;
determining a region to which the MS belongs by using one of the path loss values and the received signal strength values, and the reference value;
transmitting information reporting the region to the BS; and
receiving an allocation indicating resources in a communication band corresponding to the region,
wherein the reference value corresponds to a ratio of an area of a center region of a cell of the BS to an area of an edge region of the cell of the BS.

11. The method of claim 10, wherein the determining of the region to which the MS belongs comprises:
determining a region determinant metric by using one of the path loss values and the received signal strength values; and
determining the region of the MS by comparing the region determinant metric with the reference value.

12. The method of claim 11, wherein the region determinant metric comprises one of a difference between the path loss values for the serving cell and the at least one neighbor cell, a ratio of the path loss values, a ratio of the received signal strength values, and a ratio of the received signal strength values and noise power.

13. The method of claim 12, wherein the determining of the region determinant metric comprises considering path loss values and received signal strength values of one of 2, 3, and 4 neighbor cells which produce the greatest interference among a plurality of neighbor cells.

14. The method of claim 12, wherein the determining of the region of the MS comprises:
determining the region of the MS to the edge region if the reference value is greater than the region determinant metric; and
determining the region of the MS to the center region if the reference value is less than or equal to the region determinant metric.

15. The method of claim 10, wherein the information reporting the region consists of one bit.

16. The method of claim 10, wherein the receiving of the reference value comprises receiving the reference value through one of a broadcast channel and a traffic channel in a form of a message including a broadcasting Connection IDentifier (CID).

17. A Base Station (BS) apparatus supporting a Fractional Frequency Reuse (FFR) scheme in a wireless communication system, the apparatus comprising:
a transmitter for broadcasting a reference value for determining an FFR region;
a receiver for receiving region information determined by using the reference value from at least one Mobile Station (MS); and
an allocator for determining a communication band of at least one MS by using the region information received from the at least one MS and for allocating resources in the determined communication band to the at least one MS,
wherein the reference value corresponds to a ratio of an area of a center region of a cell of the BS to an area of an edge region of the cell of the BS.

18. The apparatus of claim 17, wherein the region information consists of one bit.

19. The apparatus of claim 17, wherein the allocator determines a location of the at least one MS to one of the center region and the edge region according to the region information, allocates a resource within a band set to a reuse rate of '1' to an MS located in the center region, and allocates a resource within a band set to a reuse rate of 'N' to an MS located in the edge region.

20. The apparatus of claim 17, wherein the reference value is broadcast through one of a broadcast channel and a traffic channel in a form of a message including a broadcasting Connection IDentifier (CID).

21. The apparatus of claim 17, further comprising a manager for adjusting the reference value according to at least one of a load condition of a cell of the BS, an interference level of the cell of the BS, an MS distribution of the cell of the BS, a load condition of at least one neighbor cell, and an interference level of the at least one neighbor cell.

22. The apparatus of claim 21, wherein the manager decreases the reference value if the loading of the cell of the BS is less than a first threshold, and increases the reference value if the loading of the cell of the BS is greater than a second threshold.

23. The apparatus of claim 21, wherein the manager decreases the reference value if the ratio of the number of MSs in the center region to the number of MSs in the edge region is less than a third threshold, and increases the reference value if the ratio of the number of MSs in the center region to the number of MSs in the edge region is greater than a fourth threshold.

24. The apparatus of claim 21, wherein the manager increases the reference value if the interference level of the neighbor cell is greater than a fifth threshold, and decreases the reference value if the interference level of the neighbor cell is less than a sixth threshold.

25. The apparatus of claim 21, wherein the manager increases the reference value if the loading of the neighbor cell is greater than a seventh threshold, and decreases the reference value if the loading of the neighbor cell is less than an eighth threshold.

26. A Mobile Station (MS) apparatus supporting a Fractional Frequency Reuse (FFR) scheme in a wireless communication system, the apparatus comprising:
a receiver for receiving a reference value for determining an FFR region from a Base Station (BS);
a measurer for measuring one of path loss values and received signal strength values for a serving cell and at least one neighbor cell;
a determinator for determining the region to which the MS belongs by using one of the path loss values and the received signal strength values, and the reference value; and a transmitter for transmitting information reporting the region to the BS, wherein the receiver receives an allocation indicating resources in communication band corresponding to the region, wherein the reference value corresponds to a ratio of an area of a center region of a cell of the BS to an area of an edge region of the cell of the BS.

27. The apparatus of claim 26, wherein the determinator determines a region determinant metric by using one of the path loss values and the received signal strength values, and determines the region of the MS by comparing the region determinant metric with the reference value.

28. The apparatus of claim 27, wherein the region determinant metric comprises one of a difference between the path loss values for the serving cell and the at least one neighbor cell, a ratio of the path loss values, a ratio of the received signal strength values, and a ratio of the received signal strength values and noise power.

29. The apparatus of claim 28, wherein the region determinant metric is determined by considering path loss values and received signal strength values of one of 2, 3, and 4 neighbor cells which produce the greatest interference among a plurality of neighbor cells.

30. The apparatus of claim 28, wherein the determinator determines the region of the MS to the edge region if the reference value is greater than the region determinant metric, and determines the region of the MS to the center region if the reference value is less than or equal to the region determinant metric.

31. The apparatus of claim 26, wherein the information reporting the region consists of one bit.

32. The apparatus of claim 26, wherein the reference value is received through one of a broadcast channel and a traffic channel in a form of a message including a broadcasting Connection IDentifier (CID).

* * * * *